United States Patent
Plavsic (10) Patent No.: US 10,613,595 B2
(45) Date of Patent: Apr. 7, 2020

(54) ENCLOSURE FOR CRYPTOCURRENCY MINING RIGS

(71) Applicant: Bojan Plavsic, Huntington Beach, CA (US)

(72) Inventor: Bojan Plavsic, Huntington Beach, CA (US)

( * ) Notice: Subject to any disclaimer, the term of this patent is extended or adjusted under 35 U.S.C. 154(b) by 0 days.

(21) Appl. No.: 16/235,834

(22) Filed: Dec. 28, 2018

(65) Prior Publication Data

US 2019/0204881 A1 Jul. 4, 2019

Related U.S. Application Data

(60) Provisional application No. 62/611,270, filed on Dec. 28, 2017, provisional application No. 62/611,237, filed on Dec. 28, 2017.

(51) Int. Cl.
| | | |
|---|---|---|
| *A47B 81/00* | (2006.01) | |
| *G06F 1/18* | (2006.01) | |
| *G06F 1/20* | (2006.01) | |

(52) U.S. Cl.
CPC ............... *G06F 1/181* (2013.01); *G06F 1/20* (2013.01)

(58) Field of Classification Search
CPC ........... H05K 7/20545; H05K 7/20572; H05K 7/20581
See application file for complete search history.

(56) References Cited

U.S. PATENT DOCUMENTS

| | | | | |
|---|---|---|---|---|
| 5,544,012 | A * | 8/1996 | Koike | H05K 7/20572 361/695 |
| 6,932,443 | B1 * | 8/2005 | Kaplan | H05K 7/20545 312/213 |
| 2003/0010490 | A1 * | 1/2003 | Reeck | H05K 7/20572 165/222 |
| 2016/0037676 | A1 * | 2/2016 | Gaal | H05K 7/20572 361/695 |
| 2016/0105993 | A1 * | 4/2016 | Li | H05K 7/20572 454/184 |
| 2016/0324035 | A1 * | 11/2016 | Gao | H04Q 1/035 |
| 2017/0071063 | A1 * | 3/2017 | Sizemore | H05K 7/1418 |
| 2017/0084516 | A1 * | 3/2017 | Harada | H01L 23/467 |
| 2017/0288239 | A1 * | 10/2017 | Wilkie | H05K 7/20572 |
| 2018/0110154 | A1 * | 4/2018 | Mayer | H05K 7/20145 |

* cited by examiner

*Primary Examiner* — Matthew W Ing (57) ABSTRACT

An enclosure for cryptocurrency mining rigs is used to reduce the noise pollution generated by the cryptocurrency mining rig. Additionally, the enclosure is designed to maintain the cryptocurrency mining rig within a desired thermal profile. To achieve this, the enclosure has a housing with a rig receptacle, a pair of ventilating lids an external vent and an access port. The ventilating lids are mounted over an opening of the rig receptacle and positioned offset from each other. This enables airflow into the rig receptacle while creating a circuitous path along which noise must travel when exiting the rig receptacle. Similarly, the external vent is a circuitous duct that extends through the housing. This enables air to flow into the housing without compromising the noise-reducing properties of the enclosure. The access port extends through the housing and enables the enclosure to be connected to external systems.

15 Claims, 9 Drawing Sheets

ENCLOSURE FOR CRYPTOCURRENCY MINING RIGS

The current application claims a priority to the U.S. Provisional Patent application Ser. No. 62/611,270 filed on Dec. 28, 2017. The current application also claims a priority to the U.S. Provisional Patent application Ser. No. 62/611,237 filed on Dec. 28, 2017.

FIELD OF THE INVENTION

The present invention generally relates to soundproofing equipment. More specifically, the present invention is an enclosure designed to reduce the noise produced by cryptocurrency mining equipment.

BACKGROUND OF THE INVENTION

As technology develops, people look for ways to improve their quality of life. The widespread internet access has allowed for advanced technological progress. Effortless and instant communication over large distances continuously shapes modern life. The instantons data transfer, allows financial transactions to be completed instantly, speeding various processes that rely on the flow of currency. The development of internet led to advancements in numerous fields, including medical, educational and financial.

Cryptocurrency defines an exchange network where users can control the creation of currency and verify the transfer of assets. At the present time Bitcoin is arguably the most popular cryptocurrency. Compared to traditional fiat, bitcoin differs by eliminating the possibility of inflation, since the total number of available coins is limited. Digital mining allows user to earn cryptocurrencies without having to exchange traditional money for coins, therefore this option can be an attractive method of income to people with knowledge in the field. Blockchain technology allows for secure transactions which confirm the validity of the transfer. When a block is discovered the miner is awarded a certain number of bitcoins. The user has various options when it comes to the equipment used to mine a block. Most traditional household set-ups can generate an unpleasant level of heat and noise. The present invention aims to solve some of these problems by disclosing an insulated soundproof storage case, that allows for both lower noise levels and reduced temperatures for cryptocurrency mining equipment.

DETAIL DESCRIPTIONS OF THE INVENTION

All illustrations of the drawings are for the purpose of describing selected versions of the present invention and are not intended to limit the scope of the present invention.

Referring to FIG. 1 through FIG. 9, the present invention, the enclosure for cryptocurrency mining rigs, is a device that is used to isolate one or more cryptocurrency mining rigs from the external environment. Preferably, the term cryptocurrency mining rig, is used herein to refer to an application-specific integrated circuit (ASIC) mining rig. However, the cryptocurrency mining rig can be various computing systems including, but not limited to, a computing device dedicated to mining or a general-purpose computing system. The present invention is an enclosure that is designed to maintain the cryptocurrency rig within a desired thermal profile. Additionally, the present invention is designed to suppress the noise generated by the cryptocurrency mining rig. Further, the present invention is designed to protect the cryptocurrency mining rig from hazards in the external environments including, but not limited to, moisture, impact, and fire. To achieve this functionality, the present invention comprises a housing 1, a rig receptacle 2, a primary ventilating lid 3, a secondary ventilating lid 4, an intermediary rim 5, at least one external vent 6, and at least one access port 7. The housing 1 functions as the primary enclosure for the present invention. The rig receptacle 2 normally traverses into the housing 1. Accordingly, the rig receptacle 2 forms a compartment into which the cryptocurrency mining rig is placed. Preferably, the external vent 6 is designed with an L-shaped duct that prevents sound from traveling along a straight path when exiting the rig receptacle 2. However, the external vent 6 can be formed into various shapes that facilitate sonic isolation. By creating a broken, or circuitous, path along which sound must travel between the rig receptacle 2 and the external environment, the external vent 6 facilitates sonically isolating the rig compartment from the external environment. Embodiments of the present invention are designed to incorporate various peripheral systems that facilitate cryptocurrency mining operations. For example, power management, communications, and control systems can be mounted within the housing 1 to enable the present invention to function as a stand-alone cryptocurrency mining solution.

Figure 1:
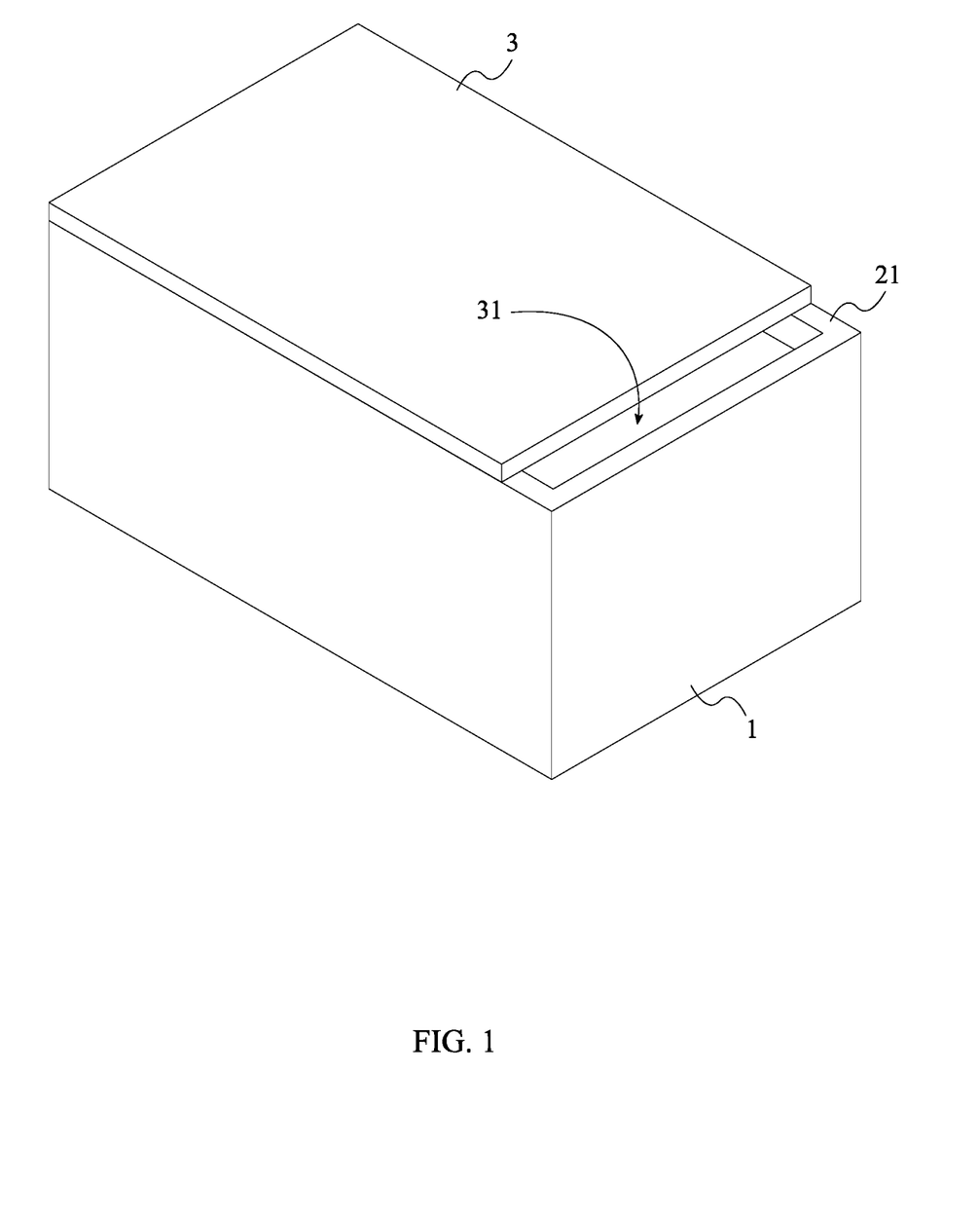
FIG. 1 is a perspective view of the present invention with the primary ventilating lid in a closed configuration.
Figure 2:
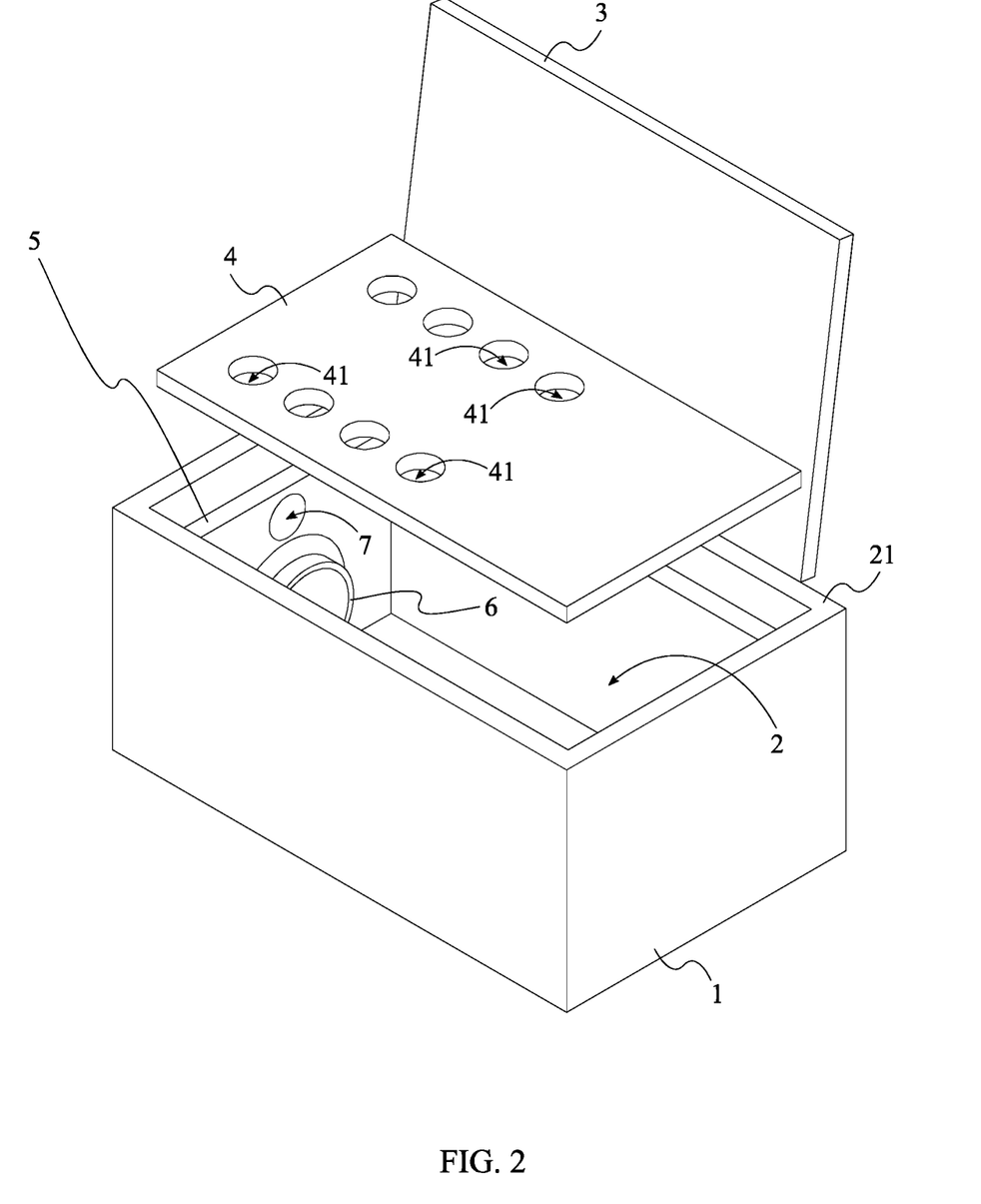
FIG. 2 is a perspective view of the present invention with the primary ventilating lid and the secondary ventilating lid in opened configurations.
Figure 3:
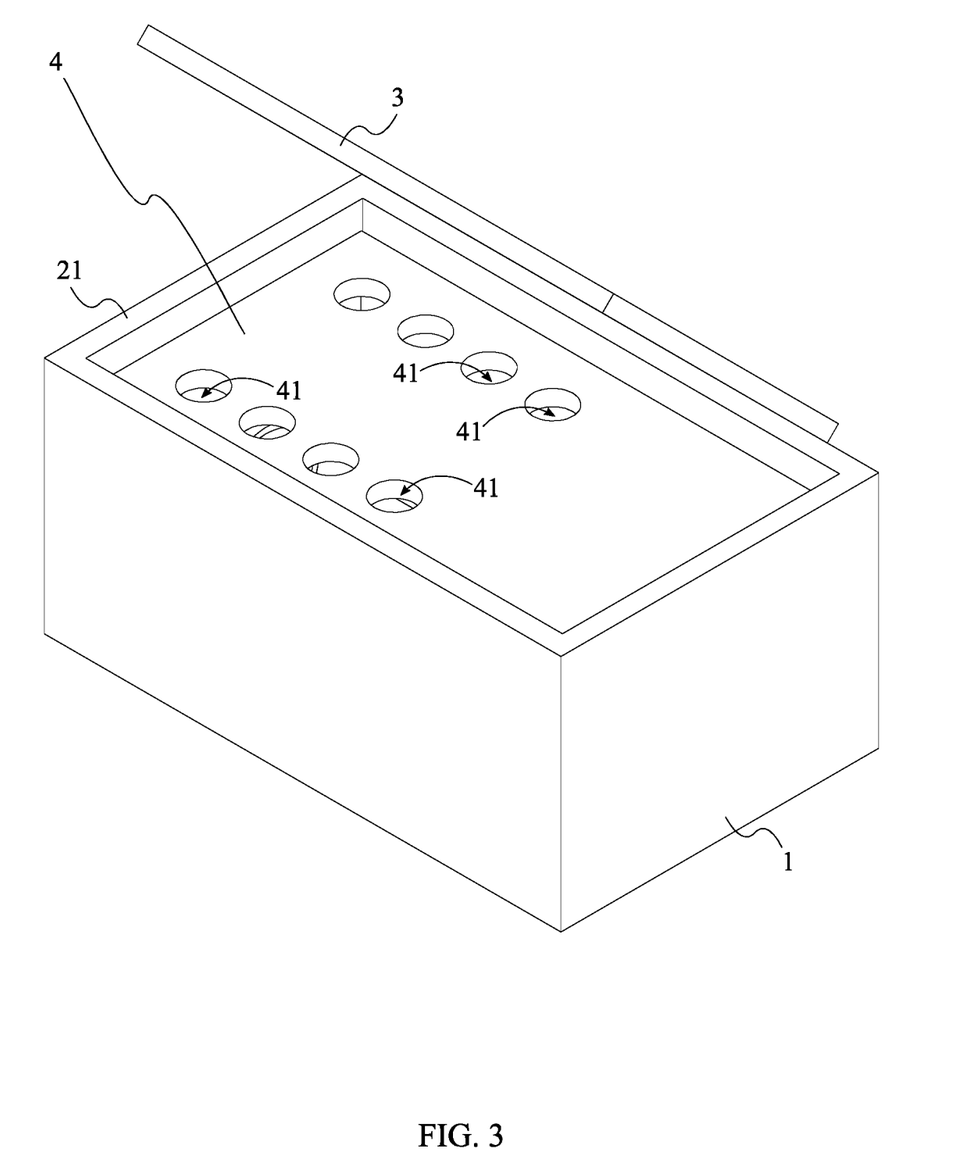
FIG. 3 is a perspective view of the present invention with the primary ventilating lid in the open configuration and the secondary ventilating lid in the closed configuration.
Figure 4:
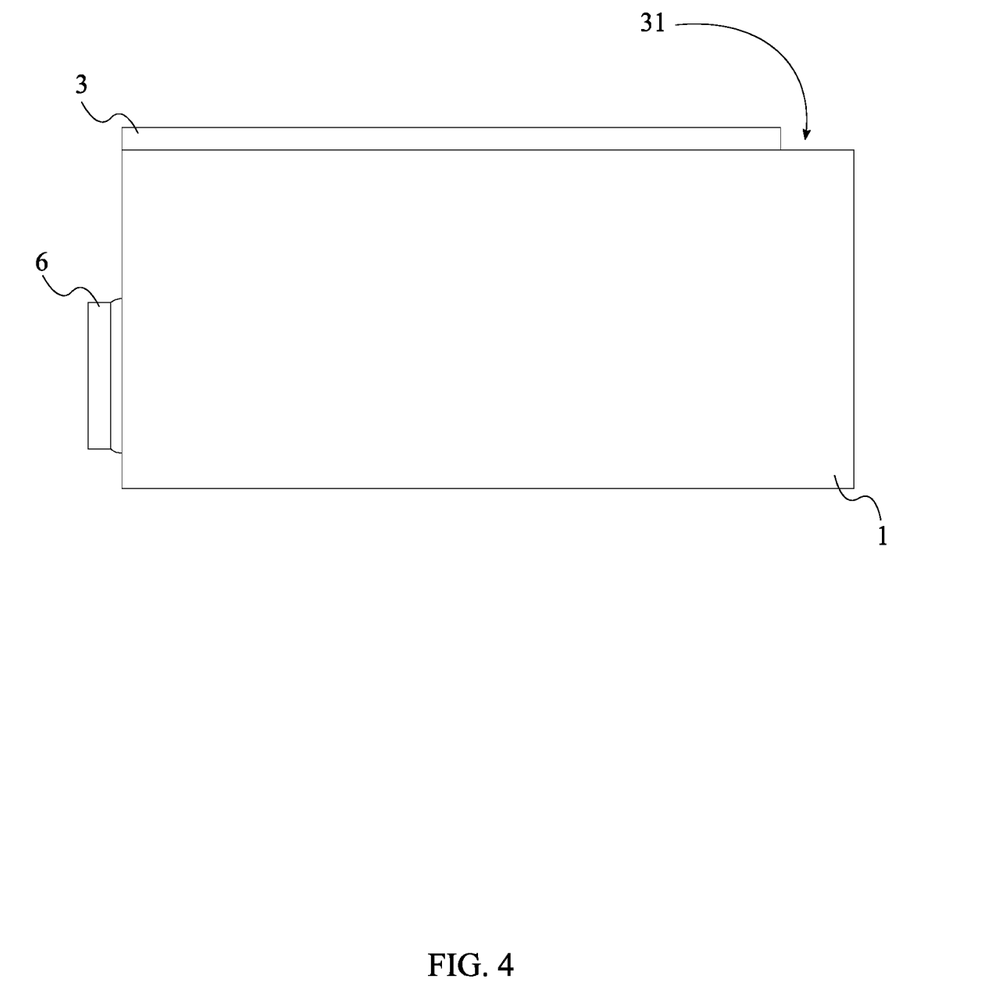
FIG. 4 is a front view of the present invention.
Figure 5:
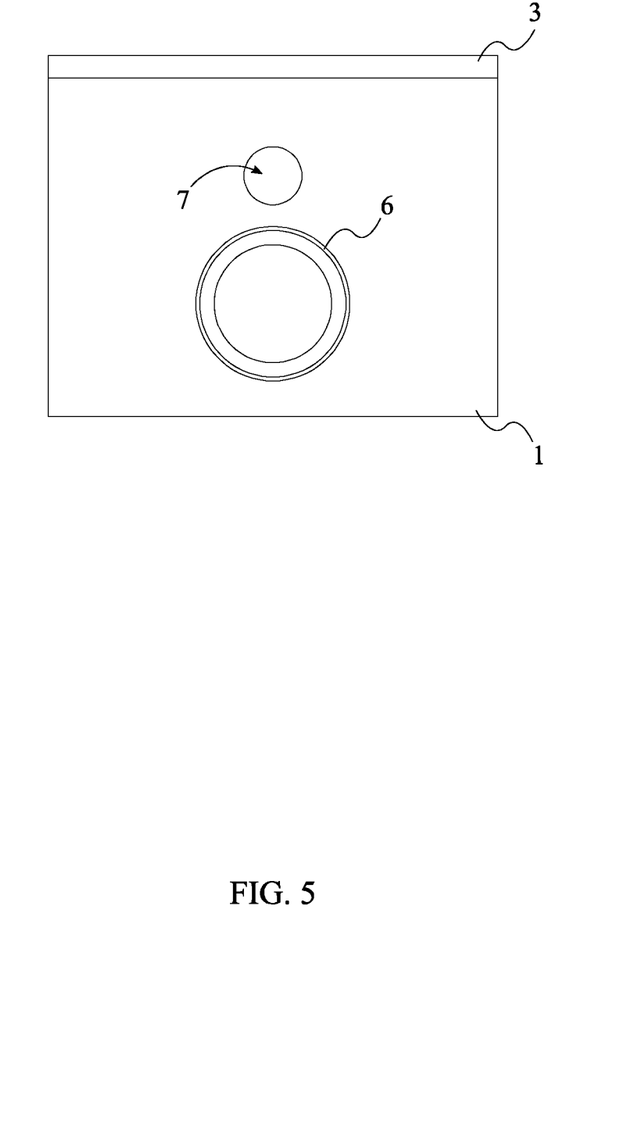
FIG. 5 is a left-side view of the present invention.

Referring to FIG. 1 and FIG. 2, the primary ventilating lid 3 and the secondary ventilating lid 4 are covers with integrated vents that permit airflow while remaining impermeable to fluids and dust. The primary ventilating lid 3 is mounted over an upper rim 21 of the rig receptacle 2. Accordingly, the primary ventilating lid 3 acts as an exterior covering that seals the rig receptacle 2. The intermediary rim 5 is laterally mounted within the rig receptacle 2. Additionally, the intermediary rim 5 is positioned offset from the upper rim 21, along the rig receptacle 2. Thus positioned, the intermediary rim 5 serves as a platform for mounting components within the rig receptacle 2. The secondary ventilating lid 4 is mounted onto the intermediary rim 5. Consequently, the secondary ventilating lid 4 is maintained in a position that is offset from the primary ventilating lid 3 to create an isolating gap between the external environment and a compartment containing the rig. Additionally, at least one first inlet vent 31 traverses through the primary ventilating lid 3. Similarly, at least one second inlet vent 41 traverses through the secondary ventilating lid 4. Accordingly, the primary ventilating lid 3 and the secondary ventilating lid 4 enable air to pass between the rig compartment and the external environment. Preferably, the first inlet vent 31 is positioned offset from the second inlet vent 41 to prevent moisture in the external environment from entering the rig compartment. from traveling. Similar to the external vent 6, the broken, or circuitous, path between the first inlet vent 31 and the second inlet vent 41, created by the offset between the first inlet vent 31 and the second inlet vent 41, facilitates sonically isolating the rig compartment from the external environment.

Figure 8:
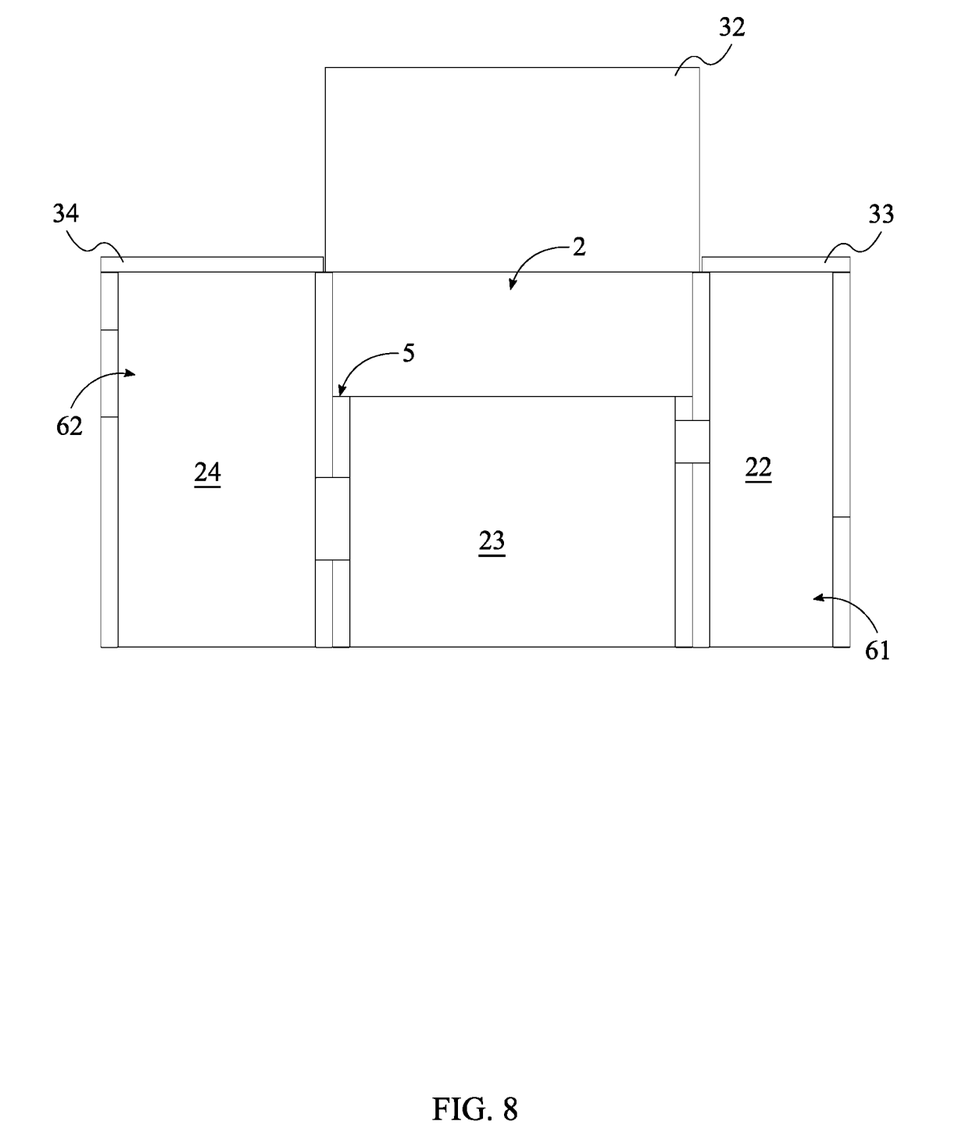
FIG. 8 is a front sectional view of the alternative embodiment of the present invention taken along line 8-8-A in FIG. 7. In this view, the housing-insulating liner and the lid-insulating liner are removed.

Referring to FIG. 1, FIG. 2, and FIG. 8, as described above, the present invention is designed to maintain the cryptocurrency mining rig within a desired thermal profile. To facilitate this, the external vent 6 traverses through the housing 1 into the rig receptacle 2. Accordingly, the external vent 6 works in concert with the first inlet vent 31 and the second inlet vent 41 to enable air to move through the rig receptacle 2. Some embodiments of the present invention are equipped with active temperature control systems that monitor the temperature of the cryptocurrency mining rig and then modify the temperature within the rig receptacle 2 as required. The access port 7 traverses through the housing 1 into the rig receptacle 2. Additionally, the access port 7 is positioned offset from the external vent 6 across the housing 1. As a result, the present invention can be connected to external systems. Specifically, the access port 7 enables the user to insert external cables and electrical connectors into the rig receptacle 2 without compromising the thermally isolating properties of the present invention.

Figure 9:
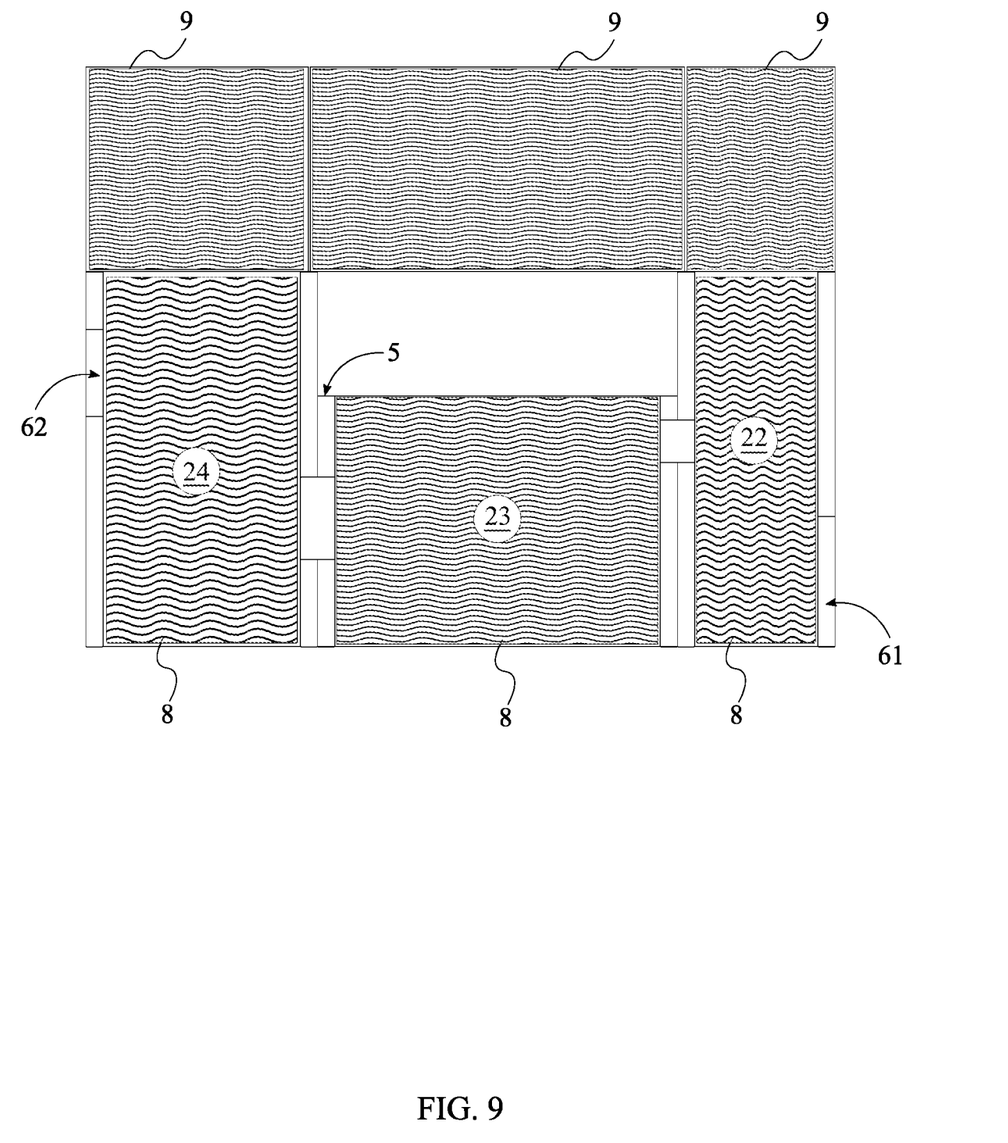
FIG. 9 is a front sectional view of the alternative embodiment of the present invention taken along line 8-8-A in FIG. 7.

Referring to FIG. 2 and FIG. 9, in addition to thermal isolation, the present invention is designed to sonically isolate the cryptocurrency mining rig from the external environment. To achieve this functionality, the present invention further comprises a housing-insulating liner 8 and a lid-insulating liner 8. The housing-insulating liner 8 and the lid-insulating liner 8 are sections of insulation that prevent the transmission of sound waves. The housing-insulating liner 8 is superimposed onto the rig receptacle 2. Additionally, the lid-insulating liner 8 is superimposed onto the primary ventilating lid 3. Consequently, the housing-insulating liner 8 and the lid-insulating liner 8 reduce the audible noise that bleeds through the rig receptacle 2 into the external environment. In some embodiments of the present invention, the housing 1 is designed to be disassembled into a plurality of panels. In these embodiments, the housing-insulating liner 8 is divided into a plurality of sections. Further, each of the plurality of sections is superimposed onto a corresponding panel from the plurality of panels. These embodiments are further equipped with a plurality of fastening mechanisms that enables the plurality of panels to be repeatedly assembled and then disassembled.

Figure 7:
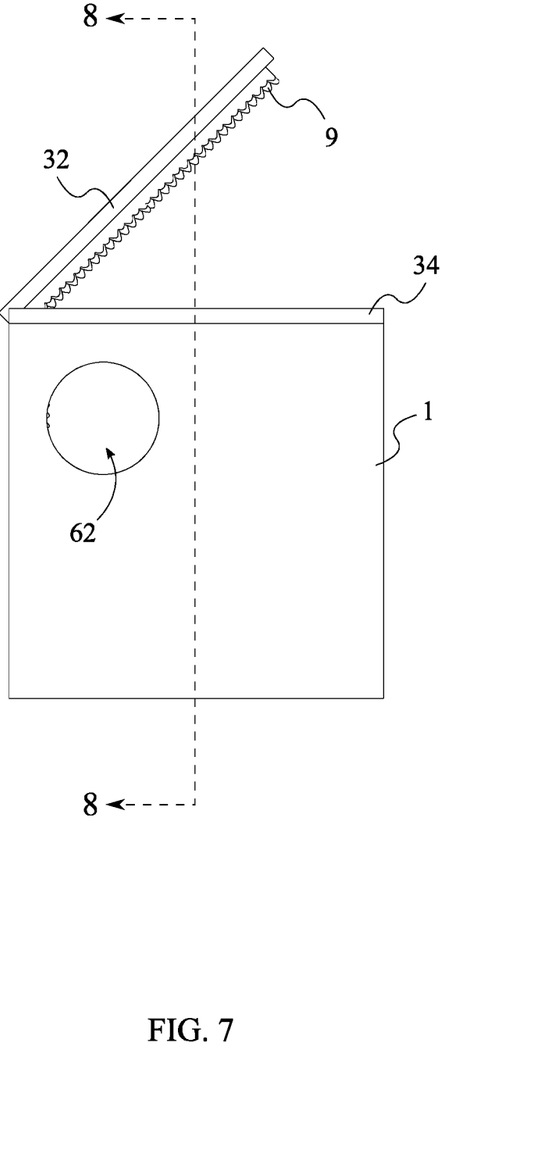
FIG. 7 is a left-side view of the alternative embodiment of the present invention indicating the direction of section cut 8.

Referring to FIG. 7 and FIG. 8, the rig receptacle 2 is designed to store the cryptocurrency mining rig as well as various other systems that facilitate mining cryptocurrencies. To facilitate this, an alternative embodiment of the rig receptacle 2 is subdivided into multiple compartments. Specifically, the rig receptacle 2 comprises an intake compartment 22, a storage compartment 23 and an exhaust compartment 24. The intake compartment 22 is positioned adjacent to the storage compartment 23, additionally, the exhaust compartment 24 is positioned adjacent to the storage compartment 23, opposite to the intake compartment 22. Preferably, the rig receptacle 2 is subdivided by a plurality of divider walls. Additionally, the exhaust compartment 24 and the intake compartment 22 are in fluid communication with the storage compartment 23. As a result, air is allowed to flow between the three compartments.

Referring to FIG. 7 and FIG. 8, as described above, the present invention is designed to maintain the cryptocurrency mining rig within a desired thermal profile. To facilitate this, the at least one external vent 6 comprises an intake port 61 and an exhaust port 62. The intake port 61 traverses through the housing 1 into the intake compartment 22. Accordingly, air from the external environment is able to flow into the intake compartment 22 by passing through the intake port 61. Similarly, the exhaust port 62 traverses through the housing 1 into the exhaust compartment 24. Consequently, the intake port 61 and the exhaust port 62 enable a crosswind to flow through the rig receptacle 2. Specifically, air from the external environment enters the intake compartment 22 through the intake port 61. This air then flows through the storage compartment 23 into the exhaust compartment 24 and is expelled through the exhaust port 62.

Figure 6:
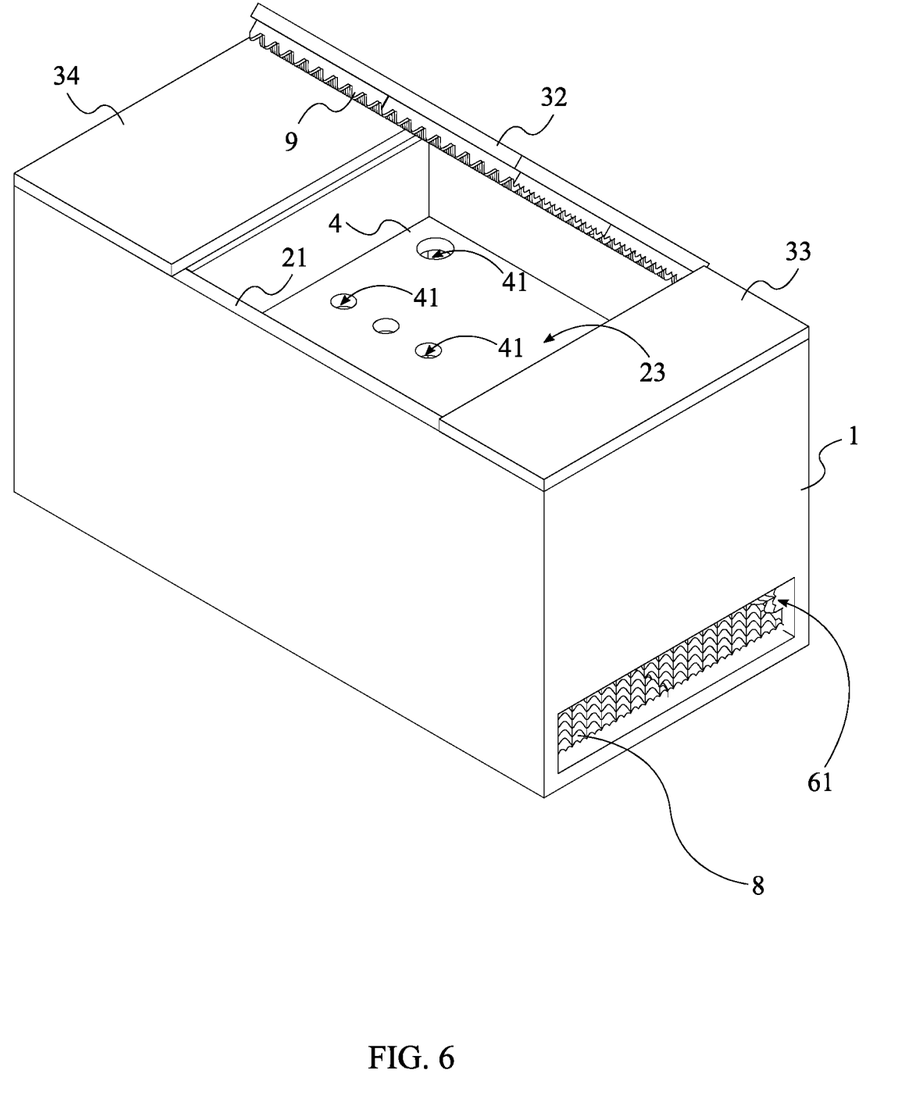
FIG. 6 is a perspective view of an alternative embodiment of the present invention with the primary storage access panel in the opened configuration.

Referring to FIG. 6, FIG. 8 and FIG. 9, in an alternative embodiment of the present invention, the primary ventilating lid 3 is divided into a multi-panel cover. Specifically, the primary ventilating lid 3 comprises a storage access panel 32, an intake access panel 33, and an exhaust access panel 34. The storage access panel 32 is mounted over an opening of the storage compartment 23, so that the storage access panel 32 can permit or restrict access to rig receptacle 2 through the opening of the storage compartment 23. Similarly, the intake access panel 33 is mounted over an opening of the intake compartment 22, so that the intake access panel 33 can permit or restrict access to rig receptacle 2 through the opening of the intake compartment 22. Likewise, the exhaust access panel 34 is mounted over an opening of the exhaust compartment 24, so that the exhaust access panel 34 can permit or restrict access to rig receptacle 2 through the opening of the exhaust compartment 24. Preferably, the storage access panel 32, the intake access panel 33, and the exhaust access panel 34 are removably mounted over a corresponding opening. This enables the user to access the various compartments of the rig receptacle 2 as desired. Additionally, in this alternative embodiment, the intermediary rim 5 is laterally mounted within the storage compartment 23 and the secondary ventilating lid 4 is mounted onto the intermediary rim 5. Accordingly, the secondary ventilating lid 4 and the storage access panel 32 work in concert to enable ambient air to enter the storage compartment 23 while preventing moisture from entering the storage compartment 23 through the first inlet vent 31 and the second inlet vent 41.

Although the invention has been explained in relation to its preferred embodiment, it is to be understood that many other possible modifications and variations can be made without departing from the spirit and scope of the invention as hereinafter claimed.

What is claimed is:

1. An enclosure for cryptocurrency mining rigs comprising:
   a housing;
   a rig receptacle;
   a primary ventilating lid;
   a secondary ventilating lid;
   an intermediary rim;
   at least one external vent;
   at least one access port;

the rig receptacle normally traversing into the housing;
the primary ventilating lid being mounted over an upper rim of the rig receptacle;
the intermediary rim being laterally mounted within the rig receptacle;
the intermediary rim being positioned offset from the upper rim, along the rig receptacle;
the secondary ventilating lid being mounted onto the intermediary rim;
the external vent traversing through the housing into the rig receptacle;
the access port traversing through the housing into the rig receptacle; and
the access port being positioned offset from the external vent across the housing.

2. The enclosure for cryptocurrency mining rigs as claimed in claim 1 comprising:
at least one first inlet vent; and
the first inlet vent traversing through the primary ventilating lid.

3. The enclosure for cryptocurrency mining rigs as claimed in claim 1 comprising:
at least one second inlet vent; and
the second inlet vent traversing through the secondary ventilating lid.

4. The enclosure for cryptocurrency mining rigs as claimed in claim 1 comprising:
a housing-insulating liner;
a lid-insulating liner;
the housing-insulating liner being superimposed onto the rig receptacle; and
the lid-insulating liner being superimposed onto the primary ventilating lid.

5. The enclosure for cryptocurrency mining rigs as claimed in claim 1 comprising:
the rig receptacle comprising an intake compartment, a storage compartment, and an exhaust compartment;
the intake compartment being positioned adjacent to the storage compartment;
the exhaust compartment being positioned adjacent to the storage compartment, opposite to the intake compartment; and
the exhaust compartment and the intake compartment being in fluid communication with the storage compartment.

6. The enclosure for cryptocurrency mining rigs as claimed in claim 5 comprising:
the at least one vent comprising an intake port and an exhaust port;
the intake port traversing through the housing into the intake compartment; and
the exhaust port traversing through the housing into the exhaust compartment.

7. The enclosure for cryptocurrency mining rigs as claimed in claim 5 comprising:
the primary ventilating lid comprising a storage access panel, an intake access panel, and an exhaust access panel;
the storage access panel being mounted over an opening of the storage compartment;
the intake access panel being mounted over an opening of the intake compartment; and
the exhaust access panel being mounted over an opening of the exhaust compartment.

8. The enclosure for cryptocurrency mining rigs as claimed in claim 5 comprising:
the intermediary rim being laterally mounted within the storage compartment;
the secondary ventilating lid being mounted onto the intermediary rim.

9. An enclosure for cryptocurrency mining rigs comprising:
a housing;
a rig receptacle;
a primary ventilating lid;
a secondary ventilating lid;
an intermediary rim;
at least one external vent;
at least one access port;
at least one first inlet vent;
the rig receptacle normally traversing into the housing;
the primary ventilating lid being mounted over an upper rim of the rig receptacle;
the intermediary rim being laterally mounted within the rig receptacle;
the intermediary rim being positioned offset from the upper rim, along the rig receptacle;
the secondary ventilating lid being mounted onto the intermediary rim;
the external vent traversing through the housing into the rig receptacle;
the access port traversing through the housing into the rig receptacle;
the access port being positioned offset from the external vent across the housing; and
the first inlet vent traversing through the primary ventilating lid.

10. The enclosure for cryptocurrency mining rigs as claimed in claim 9 comprising:
at least one second inlet vent; and
the second inlet vent traversing through the secondary ventilating lid.

11. The enclosure for cryptocurrency mining rigs as claimed in claim 9 comprising:
a housing-insulating liner;
a lid-insulating liner;
the housing-insulating liner being superimposed onto the rig receptacle; and
the lid-insulating liner being superimposed onto the primary ventilating lid.

12. The enclosure for cryptocurrency mining rigs as claimed in claim 9 comprising:
the rig receptacle comprising an intake compartment, a storage compartment, and an exhaust compartment;
the intake compartment being positioned adjacent to the storage compartment;
the exhaust compartment being positioned adjacent to the storage compartment, opposite to the intake compartment; and
the exhaust compartment and the intake compartment being in fluid communication with the storage compartment.

13. The enclosure for cryptocurrency mining rigs as claimed in claim 12 comprising:
the at least one vent comprising an intake port and an exhaust port;
the intake port traversing through the housing into the intake compartment; and
the exhaust port traversing through the housing into the exhaust compartment.

14. The enclosure for cryptocurrency mining rigs as claimed in claim 12 comprising:

the primary ventilating lid comprising a storage access panel, an intake access panel, and an exhaust access panel;
the storage access panel being mounted over an opening of the storage compartment;
the intake access panel being mounted over an opening of the intake compartment; and
the exhaust access panel being mounted over an opening of the exhaust compartment.

15. The enclosure for cryptocurrency mining rigs as claimed in claim 12 comprising:
the intermediary rim being laterally mounted within the storage compartment; and
the secondary ventilating lid being mounted onto the intermediary rim.

* * * * *